United States Patent [19]

Yang

[11] Patent Number: 5,352,470
[45] Date of Patent: Oct. 4, 1994

[54] PROCESS OF MAKING FROZEN CONFECTION WITH ENCASED WHISTLE

[76] Inventor: Ping Yang, 8220 Dorothy St., Rosemead, Calif. 91770

[21] Appl. No.: 871,819

[22] Filed: May 29, 1992

[51] Int. Cl.⁵ ............................ A23G 9/04; A23P 1/10
[52] U.S. Cl. ................................... 426/515; 264/28; 426/104; 426/132; 426/134; 446/204
[58] Field of Search ............... 426/104, 132, 134, 279, 426/280, 282, 512, 515; 264/28; 446/204

[56] References Cited

U.S. PATENT DOCUMENTS

| | | | |
|---|---|---|---|
| 267,562 | 11/1882 | Mills | 446/204 |
| 729,248 | 5/1903 | Yeager et al. | 426/249 |
| 1,567,284 | 12/1925 | Miller | 426/515 |
| 1,609,791 | 12/1926 | Broadwell | 426/104 |
| 1,980,588 | 11/1934 | Hopp | 426/134 |
| 2,156,482 | 5/1939 | Robb | 426/104 X |
| 2,417,480 | 3/1947 | Friedman | 426/104 X |
| 2,617,324 | 11/1952 | Brody | 426/104 X |
| 2,619,865 | 12/1952 | Lynch | 84/330 |
| 2,739,065 | 3/1956 | Hugin | 426/104 |
| 2,834,685 | 5/1958 | Ferguson | 426/104 |
| 3,085,883 | 4/1963 | Collier | 426/104 |
| 3,415,009 | 12/1968 | Knauf | 426/104 X |
| 3,590,749 | 7/1971 | Burns et al. | 425/173 |
| 3,666,388 | 5/1972 | Oberwelland et al. | 425/261 |
| 4,798,313 | 1/1989 | Farley | 426/104 X |

Primary Examiner—Leo B. Tentoni
Attorney, Agent, or Firm—Cislo & Thomas

[57] ABSTRACT

Methods of making a frozen confection with a whistle element encased therein are disclosed. In a first embodiment a one-piece first mold with a central through-passage containing a shoulder is used to make a first frozen part with support sticks therein. A complementarily shaped second mold is used to make a second frozen part with a matching through-passage. A whistle element is inserted into the through-passage of the first part until the element abuts the shoulder and then the second part is inserted, pressure is applied, and the two parts are frozen together. A second embodiment employs a two-piece first mold and alternative ways of securing the whistle element in the finished frozen confection are disclosed. In a third embodiment for soft frozen products such as ice-cream, an ingredient is frozen in a mold and a tubular tool is used to remove some of the frozen ingredient to create a central through-passage with a shoulder into which the whistle element is inserted and retained with a frozen plug. Other embodiments employ a two-piece and one-piece mold which define hollow spaces to accommodate a whistle element. The invention also encompasses frozen confection products made in accordance with the various disclosed methods.

29 Claims, 8 Drawing Sheets

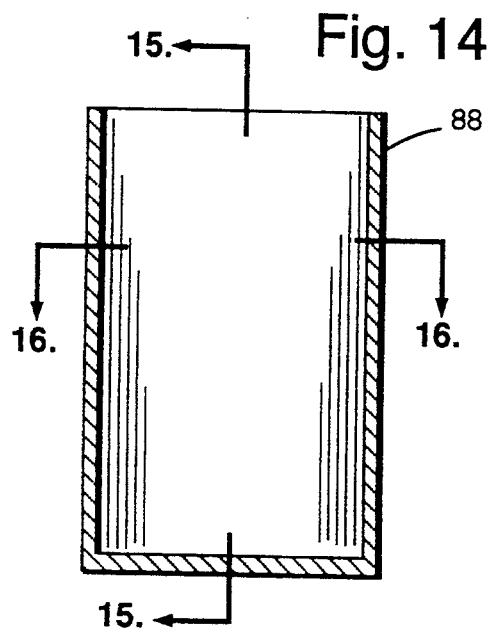
Fig. 14
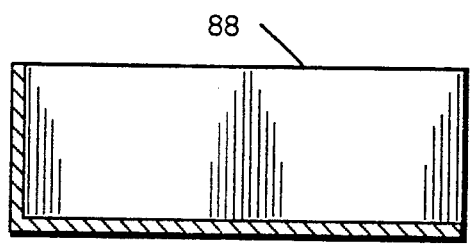
Fig. 15
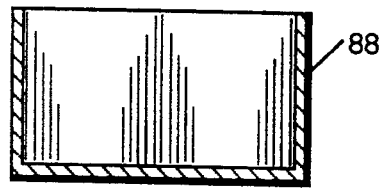
Fig. 16
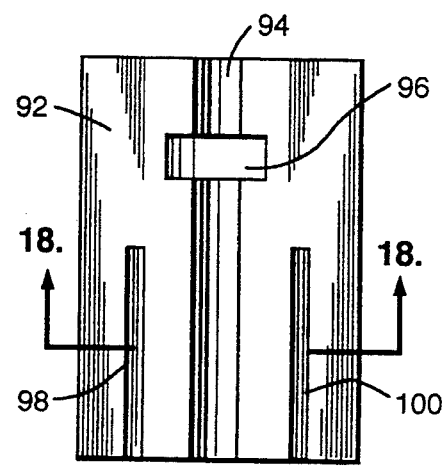
Fig. 17
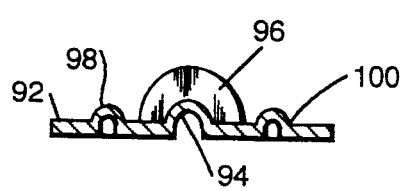
Fig. 18
Fig. 19
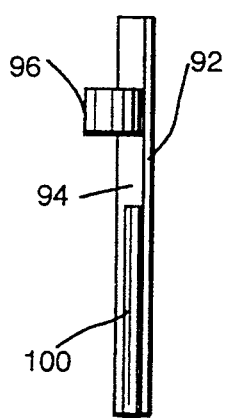

PROCESS OF MAKING FROZEN CONFECTION WITH ENCASED WHISTLE

FIELD OF THE INVENTION

This invention pertains to confections that contain a toy of some sort, and in particular to a frozen confection that has a whistle encased therein.

BACKGROUND OF THE INVENTION

Children love to eat confections and are also constantly in need of a source of amusement to keep them out of trouble. Parents and others who come into contact with children have had a long-felt need for a combination confection and toy that will satisfy the tastebuds of hungry children as well as their urge to play. The foregoing remarks apply also to many childlike adults. Previous inventions in the field have lacked all the advantages of the present one, which comprises methods and the products associated therewith of making iced confections with a whistle inside.

The following United States patents might be considered relevant in connection with the present application:

| U.S. Pat. No. | Inventor | Issue Date |
|---|---|---|
| 267,562 | G. M. Mills | Nov. 14, 1882 |
| 729,248 | H. Yeager et al. | May 26, 1903 |
| 1,567,284 | F. B. Miller | Dec. 29, 1925 |
| 1,609,791 | W. C. Broadwell | Dec. 7, 1926 |
| 1,980,588 | A. Hopp | Nov. 13, 1934 |
| 2,156,482 | J. F. Robb | May 2, 1939 |
| 2,417,480 | E. Friedman | Mar. 18, 1947 |
| 2,617,324 | D. Brody | Nov. 11, 1952 |
| 2,619,865 | H. C. Lynch | Dec. 2, 1952 |
| 2,739,065 | A. C. Hugin | Mar. 20, 1956 |
| 2,834,685 | M. J. Ferguson | May 13, 1958 |
| 3,085,883 | E. L. Collier | April 16, 1963 |
| 3,415,009 | K. O. Knauf | Dec. 10, 1968 |
| 3,590,749 | E. Burns et al. | July 6, 1971 |
| 3,666,388 | H. Oberwelland et al. | May 30, 1972 |
| 4,798,313 | B. L. Brent | Jan. 17, 1989 |

U.S. Pat. No. 2,617,324 to Brody is directed to a concept wherein a whistle element is combined with a frozen confection and wherein the stick comprises part of the whistle element.

U.S. Pat. No. 2,156,482 to Robb discloses a frozen confection or the like wherein a handle element is connected to a balloon attachment which has a combined whistle, and wherein the deflated balloon is contained within a confection such as ice cream, as shown in FIG. 1 of the patent.

U.S. Pat. No. 3,085,883 to Collier is directed to a confection having an inedible element disposed therein. In the embodiment of FIG. 10 the inedible statuette 72 is embedded within the ice cream bar 70. The ice cream bar 70 is supported by the handle or stick 74, but the statuette is not incorporated into the ice cream by being inserted into a recess previously formed, and then subsequently retained by a separately molded and frozen closure.

U.S. Pat. No. 1,567,284 to Miller is directed to a method and apparatus for forming whistle pops. A confection is first molded in the form of a whistle having the end opposite the mouthpiece open. Subsequently, the handle 45 is inserted and the wall 44 is molded to close the open end opposite the mouthpiece.

U.S. Pat. No. 1,980,588 to Hopp is directed to a frozen confection supported by a handle. As shown in FIG. 4, the frozen confection is provided with a passage 14 formed therein which is subsequently filled by the wooden stick 16 with its protecting covering 17, preferably at the time of sale. This reference discloses the formation of a frozen confection with a bore formed therein for receiving an inedible element, the stick, which is secured within the bore by means of a second confection element, a coating 17. The coating 17 is disclosed as being a candy type confection which is not actually molded.

U.S. Pat. No. 1,609,791 to Broadwell is directed a combined confection and whistle having a handle or stick which is offset from a recess connected with the whistle element. The confection shown and described is a candy article commonly known as a lollypop.

U.S. Pat. No. 2,834,685 to Ferguson is directed to a combination confection holder and toy boat. A stick 16 is disposed off center with respect to the major plane of the confection.

U.S. Pat. No. 2,619,865 to Lynch is directed a supporting stick or handle for a confection incorporating a whistle. The confection 10, which may be frozen confection, is supported by a stick 11 which is hollow and constitutes a whistle. However, the confection does not form any part of the sound forming cavity of the whistle.

U.S. Pat. No. 729,248 to Yeager and Rigney is directed to a method of making block ice cream. A shaped block A is first frozen and then subsequently placed in a mold into which the unfrozen confection for forming a block B is added, the combination then being frozen to form the finished product.

SUMMARY OF THE INVENTION

In a first embodiment the invention includes a method of making an iced confection with a whistle inside comprising the steps of filling a first mold with a first ingredient, the first mold having an open top and a generally central hollow portion with a shoulder at an interface between a cylindrical first space and a frustoconical second space; holding in place at least one generally narrow and elongated support member having one end immersed in the first ingredient in the first mold and another end outside the first ingredient; filling a second mold with a second ingredient, the second mold having an open top, a frustoconical outer wall, and an inner wall defining a cylindrical hollow portion extending through the mold; freezing the first and second ingredients in the first and second molds to produce a first frozen part matching the inside contours of the first mold and a second frozen part matching the inside contours of the second mold, respectively; removing the first and second frozen parts from the first and second molds; inserting a whistle element into a space of the first frozen part corresponding to the second, frustoconical space of the first mold until the whistle element abuts a shoulder of the first frozen part corresponding to the shoulder of the first mold; inserting the second frozen part into the space in the first part until it abuts the whistle element; applying pressure to an outer end of the second frozen part; and freezing an outer surface of the first frozen part in contact with an inner surface adjoining the space in the second frozen part to bond the first and second parts together.

The first and second ingredients can be substantially the same or substantially different, and the at least one generally narrow and elongated support member can comprise a wooden stick.

A second, alternative method of making an iced confection with a whistle inside makes use of a first, two-piece mold and a second, unitary mold, comprising the steps of filling the first mold with a first ingredient, the mold comprising a first piece including a container with an open top and a closed bottom with an open cylindrical tube extending outwardly therefrom, and a second, tubular piece including a central cylindrical portion, a first, frustoconical end portion, and a second, cylindrical end portion smaller in diameter than the central portion, the cylindrical end portion of the second piece fitting inside, and sealed by sealing means to, the cylindrical tube extending outwardly from the bottom of the first piece; holding in place at least one generally narrow and elongated support member having one end immersed in the first ingredient in the first mold and another end outside the first ingredient; filling the second mold with a second ingredient, the second mold having a frustoconical shape matching the frustoconical end portion of the first piece of said first mold, and a cylindrical hollow portion extending through the second mold; freezing the first and second ingredients in the first and second molds to produce a first frozen part matching the inside contours of the first mold, the first frozen part having a central frustoconical space at one end, and a second frozen part matching the inside contours of the second mold, respectively; removing the first and second frozen parts from the first and second molds; inserting a whistle element into a space of the first frozen part corresponding to the frustoconical space of the first piece of the first mold until the whistle element abuts a shoulder of the first frozen part corresponding to a place where the first end portion and the central portion of the first piece of the first mold meet; inserting the second frozen part into the first frozen part until it abuts the whistle element; applying pressure to an outer end of the second frozen part; and freezing an outer surface of the second frozen part in contact with an inner surface of the space in the first frozen part to bond the first and second parts together. The sealing means can comprise a plurality of O-rings disposed in circular grooves in an outer surface of the open cylindrical tube extending outwardly from the bottom of the second piece of the first mold.

Alternatively, the steps following the inserting of the whistle step can comprise filling a space between the whistle element and the first frozen part with a third, liquid ingredient so that an outer periphery of the whistle element is in wetted contact with an inner surface adjoining the frustoconical space in the first frozen part; and freezing the third, liquid ingredient to bond the first frozen part and the whistle element together. The first and third ingredients can be substantially the same and the second ingredient substantially different from the first and third ingredients, or the first, second, and third ingredients can be substantially different from each other, or all three ingredients can be substantially the same.

In still another alternative, the steps following the removing step can comprise dipping a whistle element into a third, liquid ingredient to wet the whistle element with the third, liquid ingredient; inserting the whistle element into the first frozen part so that an outer periphery of the whistle element is in wetted contact with an inner surface adjoining the frustoconical space in the first frozen part; and freezing the third, liquid ingredient to bond the first frozen part and the whistle element together.

A third, alternative embodiment of the method of the invention includes filling a mold with a first ingredient, the mold having an open top and a hollow interior portion; holding in place at least one generally narrow and elongated support member having one end immersed in a noncentral portion of the first ingredient in the mold and another end outside the first ingredient; freezing the first ingredient in the mold to produce a first frozen quantity of the ingredient matching the inside contours of the mold; removing a central part of the first frozen quantity of the ingredient using a tubular tool having a frustoconical first end and a narrower cylindrical middle portion and second end, to leave a central hollow space in the first frozen quantity of the ingredient having a frustoconical first end and a narrower cylindrical middle portion and second end; inserting a whistle element into the frustoconical first end of the central hollow space of the first frozen quantity of the first ingredient until the whistle element abuts a shoulder of the central hollow space of the first frozen quantity corresponding to where the frustoconical end of the space meets the narrower cylindrical middle portion of the space; inserting a second frozen quantity of the ingredient having a shape complementary to the frustoconical end and having a cylindrical through hole therethrough into the space in the first frozen quantity until the second frozen quantity of the ingredient abuts the whistle element; applying pressure to an outer end of the second frozen quantity; freezing an outer surface of the first frozen quantity in contact with an inner surface adjoining the space in the second frozen quantity to bond the first and second frozen quantities together; and removing the first and second frozen quantities from the mold. An inside wall of the narrower cylindrical middle portion of the tubular tool can have a plurality of inwardly projecting hooks thereon to facilitate the removing of the central part of the first frozen quantity of the ingredient.

In yet another embodiment of the invention a method of making an iced confection with a whistle inside using a two-piece mold comprises filling the mold with a first ingredient, the mold comprising a first piece open at an upper end and a first side adjoining the upper end and closed at a lower end, opposed second and third sides connecting the upper and lower ends, and a fourth side opposite the open first side, the mold further including a second piece including a generally flat plate having a shape matching the open side of the first piece and having a first central hollow semicylindrical protuberance running from an upper to a lower end and a second central hollow semicylindrical protuberance of short extent, concentric with the first protuberance, and first and second cylindrical channels on both sides of the first central hollow semicylindrical protuberance, beginning at the lower end and terminating partway up the second piece, the first and second pieces being joined together by joining means to define a container having an open top end and an interior volume into which the first and second protuberances project; freezing the first ingredient in the mold to produce a first frozen part matching the inside contours of the mold, the first frozen part having a central semicylindrical channel running from a top end to a bottom end thereof with a larger semicylindrical space, and first and second cylindrical channels extending partway up the frozen part from the bottom end; removing the first frozen part from the mold; filling the mold with a second ingredient; freezing the second ingredient in the mold to produce a second frozen part matching the inside contours of the mold, the second frozen part having a shape substantially the same as the first frozen part; removing the second frozen part from the mold; inserting a whistle element into the larger semicylindrical space of the first frozen part and first and second elongated support members into the first and second cylindrical channels; spreading a liquid on a surface of the first frozen part intended to contact a matching surface of the second frozen part; placing the second frozen part in contact with the first frozen part with the whistle element and the support members enclosed between the parts; applying pressure to opposing outer sides of the first and second frozen parts; and freezing opposed surfaces of sides of the first and second frozen parts having the channels therein to bond the first and second parts together. The joining means can comprise two substantially C-shaped clip members which are slipped over the second and third sides of the first and second pieces. The first and second ingredients can be substantially the same or substantially different. In a variation of this embodiment of the invention a substantially similar second mold filled with a second ingredient can be employed so that the contents of the two molds can be frozen at the same time to produce the first and second frozen parts.

In still one more embodiment of the invention a method of making an iced confection with a whistle inside comprises filling a mold with a first ingredient, the mold having a closed bottom and an open top and a generally central hollow, cylindrical portion extending from the open top to the closed bottom; holding in place at least one generally narrow and elongated support member having one end immersed in the first ingredient in the first mold and another end outside the first ingredient; freezing the first ingredient in the mold to produce a first frozen part matching the inside contours of the mold; removing the first frozen part from the mold; creating a hollow recess in the first frozen part communicating with the cylindrical hollow portion, the recess having a shape to accommodate a whistle element and located with respect to the cylindrical hollow portion so as to allow air passage through the whistle element when the whistle element is inserted into the recess; inserting the whistle element into the recess in the first frozen part; forming a plug of a second frozen ingredient having a shape which will fit into the recess where the recess communicates with an exterior surface of the first frozen part; inserting the plug into the recess in the first frozen part until the second frozen part abuts the whistle element; applying pressure to an outer end of the plug; and freezing an outer surface of the first frozen part in contact with and adjoining the plug bond the first frozen part and the plug together. The first and second ingredients can be different or substantially the same. The generally narrow and elongated support member can comprise a wooden stick. The step of creating the hollow recess can be accomplished with a rotating wheel having teeth on an outer periphery thereof or with a heated tool having an appropriate shape. The invention also comprises a confection with a whistle inside made according to the method just described.

The novel features which are characteristic of the invention will be better understood from the following description in connection with the accompanying drawings. It should be appreciated, however, that each of the drawings is given for the purpose of illustration and description only and that the drawings are not intended to be a definition of the limits of the present invention.

BRIEF DESCRIPTION OF THE DRAWINGS

FIG. 14 is a top plan view of a first part of a composite mold of a second alternative embodiment of the present invention.

FIG. 15 is a cross-sectional view of the mold part of FIG. 14 as indicated.

FIG. 16 is a cross-sectional view of the mold part of FIG. 14 as indicated.

FIG. 17 is a top plan view of a second part of a composite mold of a second alternative embodiment of the present invention.

FIG. 18 is a cross-sectional view of the second mold part of FIG. 17.

FIG. 19 is a side view of the second mold part of FIG. 17.

DETAILED DESCRIPTION OF THE INVENTION

Figure 1:
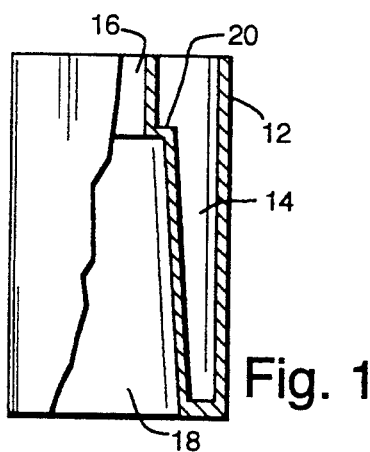
FIG. 1 is a side elevational view, partly broken away and in cross section, of a first mold of the present invention.
Figure 2:
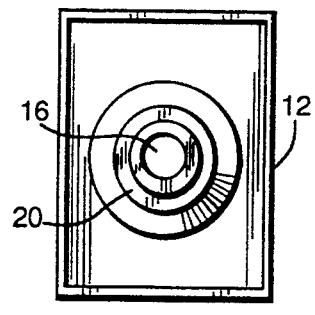
FIG. 2 is a top plan view of the mold of FIG. 1.

Referring to FIGS. 1 and 2, a mold 12 with relatively thin walls and an open top defines an interior volume 14 to hold a liquid confection material for freezing. A hollow central portion of mold 12 comprises an upper cylindrical part 16 joined to a lower frustoconical part 18 resulting in a shoulder 20.

Figure 3:
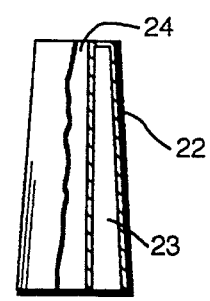
FIG. 3 is a side elevational view, partly broken away and in cross section, of a second mold of the present invention.
Figure 4:
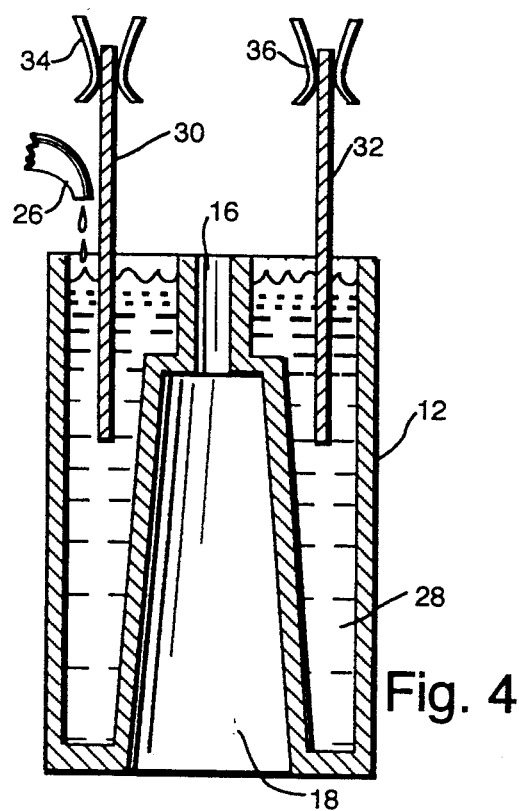
FIG. 4 is a cross-sectional view of the mold of FIG. 1 being filled in accordance with the present invention.

FIG. 3 shows a second mold 22 having a shape complementary to the frustoconical part 18 of mold 12, with an interior volume 23 and a central cylindrical through-hole 24 having the same diameter as part 16 of mold 12. As shown in FIG. 4, the interior volume 14 of mold 12 is filled, as through filler tube 26, with ingredient 28.

Figure 5:
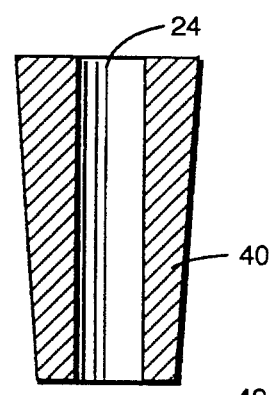
FIG. 5 is a cross-sectional view of the second mold of FIG. 3 being filled in accordance with the present invention.
Figure 5:
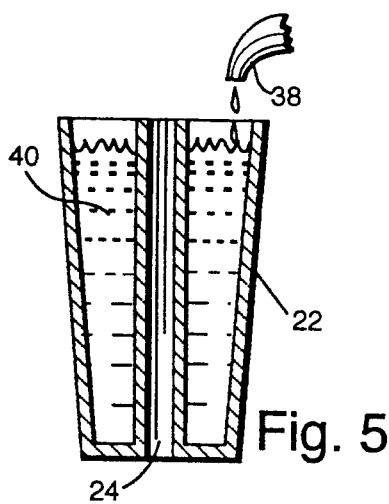

Sticks 30 and 32 are held by holders 34 and 36 before the ingredient 28 is frozen or are inserted into ingredient 28 when it is partially frozen but not yet hardened. Molds 12 and 22 are preferably made of thin-walled stainless steel or a suitable plastic material. As shown in FIG. 5, the interior volume 23 of mold 22 is filled through filler tube 38 with ingredient 40. Ingredients 28 and 40 in general may be different so that a variety of flavors can be combined into a single frozen confection.

After the ingredients 28 and 40 of molds 12 and 22 are frozen, the frozen ingredients 28 and 40 are removed. One way to do this is simply to heat the molds by dipping them into hot water so that the frozen ingredients 28 and 40 can be slid out or pulled out with ease.

Figure 6:
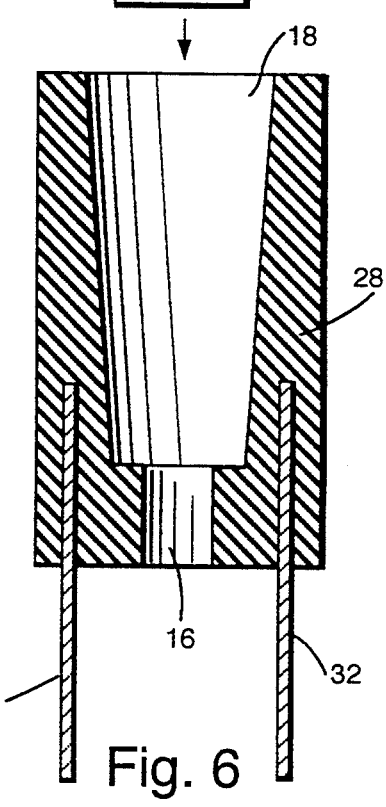
FIG. 6 is a cross-sectional view of the parts of the frozen confection with whistle of the present invention before assembly.
Figure 7:
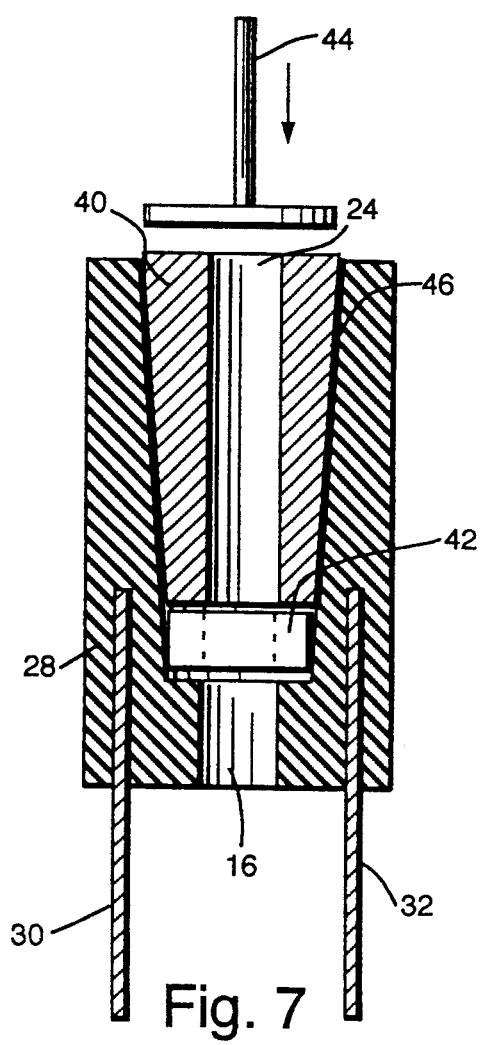
FIG. 7 is a cross-sectional view of the frozen confection with whistle of the present invention being assembled.

After removal of the frozen contents of molds 12 and 22, a whistle element 42 is inserted into the bottom of frustoconical space 18 and frozen ingredient 40 in the shape of a frustoconical plug with a central through-hole 24 is inserted on top of whistle element 42 in space 18, as shown in FIGS. 6 and 7.

Referring further to FIG. 7, a pressing device 44 is applied to the larger end of frozen plug 40 so that the contacting surfaces of 28 and 40 will melt and refreeze according to the well known-effect of regelation. The entire product is refrozen, and in particular, the contacting boundary 46 between frozen ingredient 40 and frozen ingredient 28 is frozen to bond the two part together.

The end result of the assembly procedure indicated in FIGS. 6 and 7 is a frozen confection that can be held in the hand by sticks 30 and 32, having a cylindrical through-hole defined by 16 and 24 with an encased whistle element 42 inside the confection. When one blows into through-hole 24, air passes through whistle element 42 and sound is produced.

Figure 9:
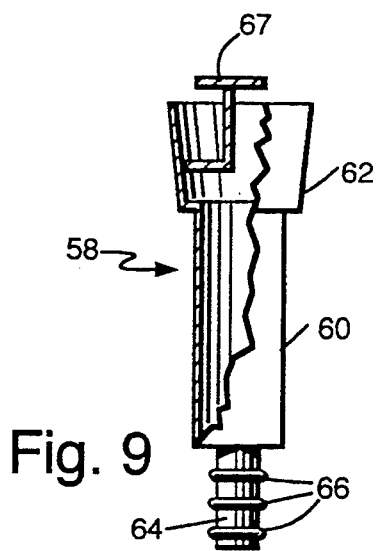
FIG. 9 is a side elevational view, partly broken away and in cross section, of a second part of a composite mold of an alternative embodiment of the present invention.
Figure 8:
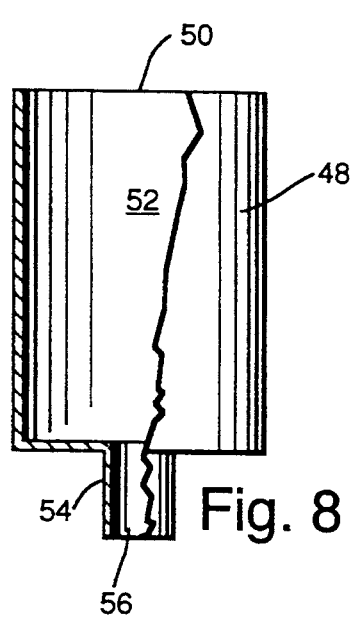
FIG. 8 is a side elevational view, partly broken away and in cross section, of a first part of a composite mold of an alternative embodiment of the present invention.

Referring to FIGS. 8 and 9, a different type of two-piece mold for producing iced confections with an encased whistle is shown. In FIG. 8, a first part 48 of the two-piece mold comprises a generally parallelipipedal upper portion with an open end 50 and an interior hollow portion 52 with a depending lower cylindrical portion 54 having an internal bore 56.

FIG. 9 shows a second part 58 of the two-piece mold comprising a generally cylindrical body 60 ending in a larger frustoconical portion 62 at one end and in a smaller cylindrical portion 64 at the other. Cylindrical portion 64 has circular grooves on its outer surface to accommodate O-rings 66. Handling piece 67 facilitates removal of second part 58 from first part 48.

Figure 10:
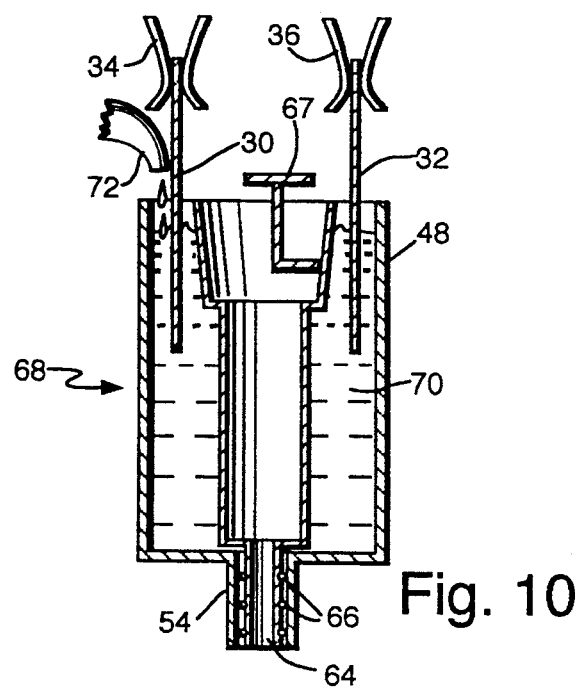
FIG. 10 is a cross-sectional view of the assembled composite mold comprising the first and second parts of FIGS. 9 and 10.

As shown in FIG. 10, two-piece mold 68 is assembled by inserting portion 64 with its associated O-rings 66 into inner bore 56 of first part 48. Interior space 52 between the outer walls of second part 58 and the inner walls of first part 48 is filled with an ingredient 70 from fill tube 72 to produce the frozen condiment.

As before, sticks 30 and 32 are held by holders 34 and 36 in liquid ingredient 70 before it is frozen. Alternatively, sticks 30 and 32 could be inserted into ingredient 70 when it is partially frozen but not yet hardened. O-rings 66 provide a seal between part 54 of first part 48 and part 64 of second part 58.

Figure 11:
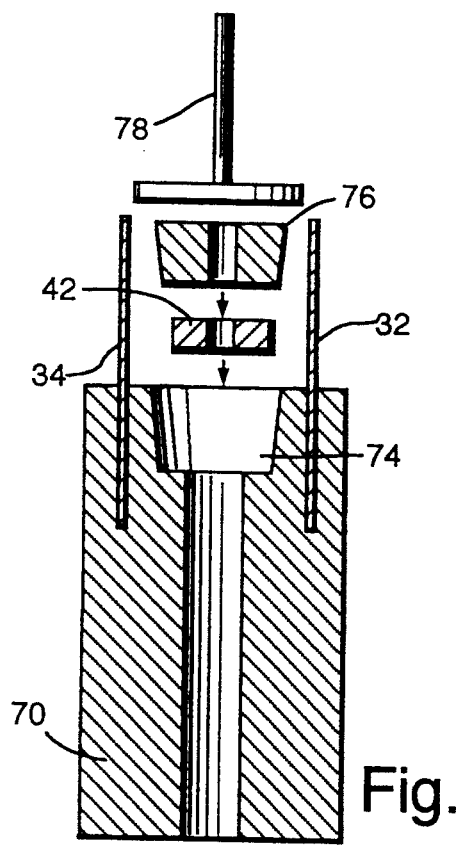
FIG. 11 is a cross-sectional view of the frozen contents of the mold of FIG. 10 after removal from the mold with a whistle and frozen plug being inserted.

After ingredient 70 is frozen, the two-piece mold consisting of first and second parts 48 and 58 can be removed from around frozen ingredient 70 by dipping the mold in hot water. Referring to FIG. 11, after frozen ingredient 70 is separated from the mold a whistle element 42 is inserted into frustoconical space 74, followed by a plug 76 of frozen ingredient made in a single-piece mold similar to that shown in FIGS. 3 and 5. As before, pressure is applied by a pressure-applying means 78 to bond plug 76 to frozen ingredient 70. The difference between this process and the process shown in FIGS. 1 through 7 is that whistle 42 and plug 40 are inserted from above in the latter case, whereas whistle 42 and plug 76 are inserted from below in the former case.

Figure 12:
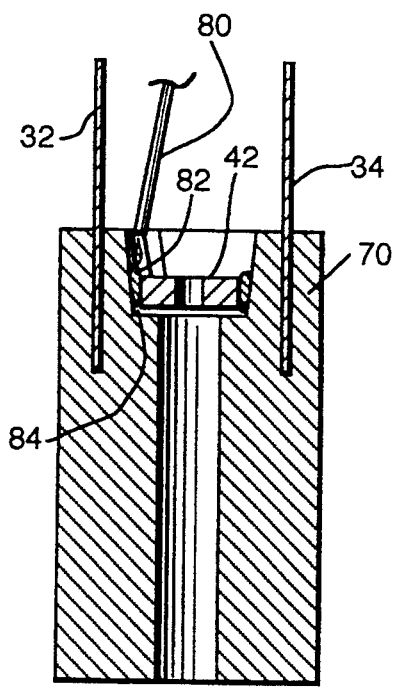
FIG. 12 is a cross-sectional view of the frozen contents of the mold of FIG. 10 after removal from the mold with a whistle inserted and a filler being added to freeze around the whistle.

As an alternative, referring to FIG. 12, a small-diameter filler tube 80 can be used to spread ingredient 82 around the periphery of whistle 42 inside frustoconical space 74. The temperature of ingredient 82 is controlled so that it will fill the space 84 before being frozen. Ingredient 82 will freeze, either in the process of filling up the space 84 or after storage for refreezing, so that whistle 42 is bonded to frozen ingredient 70. In this alternative procedure plug 76 is no longer necessary.

Figure 13:
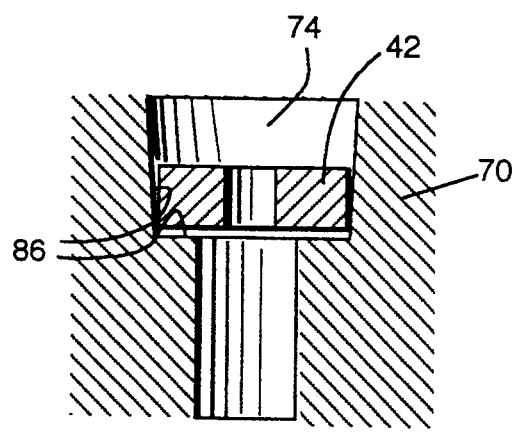
FIG. 13 is a fragmentary cross-sectional view of the central part of the frozen contents of the mold of FIG. 10 after removal from the mold with a wetted whistle having been inserted to freeze in place.

An even easier procedure for bonding whistle 42 to frozen ingredient 70 is shown in FIG. 13, where prior to being put into place a whistle 42 is dipped into water or milk to cover the surface with liquid. The wetted contact surfaces 86 will freeze and bond together whistle 42 and frozen ingredient 70. Experiment has shown the bonding to be fairly strong so long as whistle 42 and frozen ingredient 70 are in proper contact during the procedure.

Another alternative process is shown in FIGS. 14 through 21. A first piece 88 of another type of two-piece mold is depicted in FIGS. 14 through 16. A second piece 90 of the two-piece mold is shown in FIGS. 17 through 19. Second piece 90 comprises a rectangular flat plate 92 with a first central semicylindrical protrusion 94 running along the length of plate 92 and a second semicylindrical protrusion 96 of larger diameter near one end of first protrusion 94. First and second stick channels 98 and 100 are situated on both sides of, and parallel to, protrusion 94 and extend partway along the length of plate 92.

Figure 20:
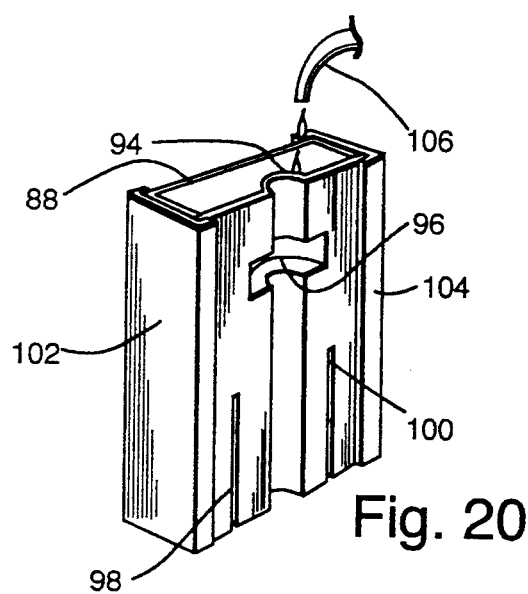
FIG. 20 is a perspective view of the assembled composite mold comprising the first and second parts of FIGS. 14 and 17.

Referring to FIG. 20, first and second pieces 88 and 90 are held together with end guides 102 and 104 which slip over the ends of 88 and 90. End guides 102 and 104 can be roughly C-shaped and made of a spring-like material to effectively clip pieces 88 and 90 together and seal the composite mold against leakage. A filler tube 106, used to fill the mold with a confection ingredient, is shown at the open end of the mold in FIG. 20.

Figure 21:
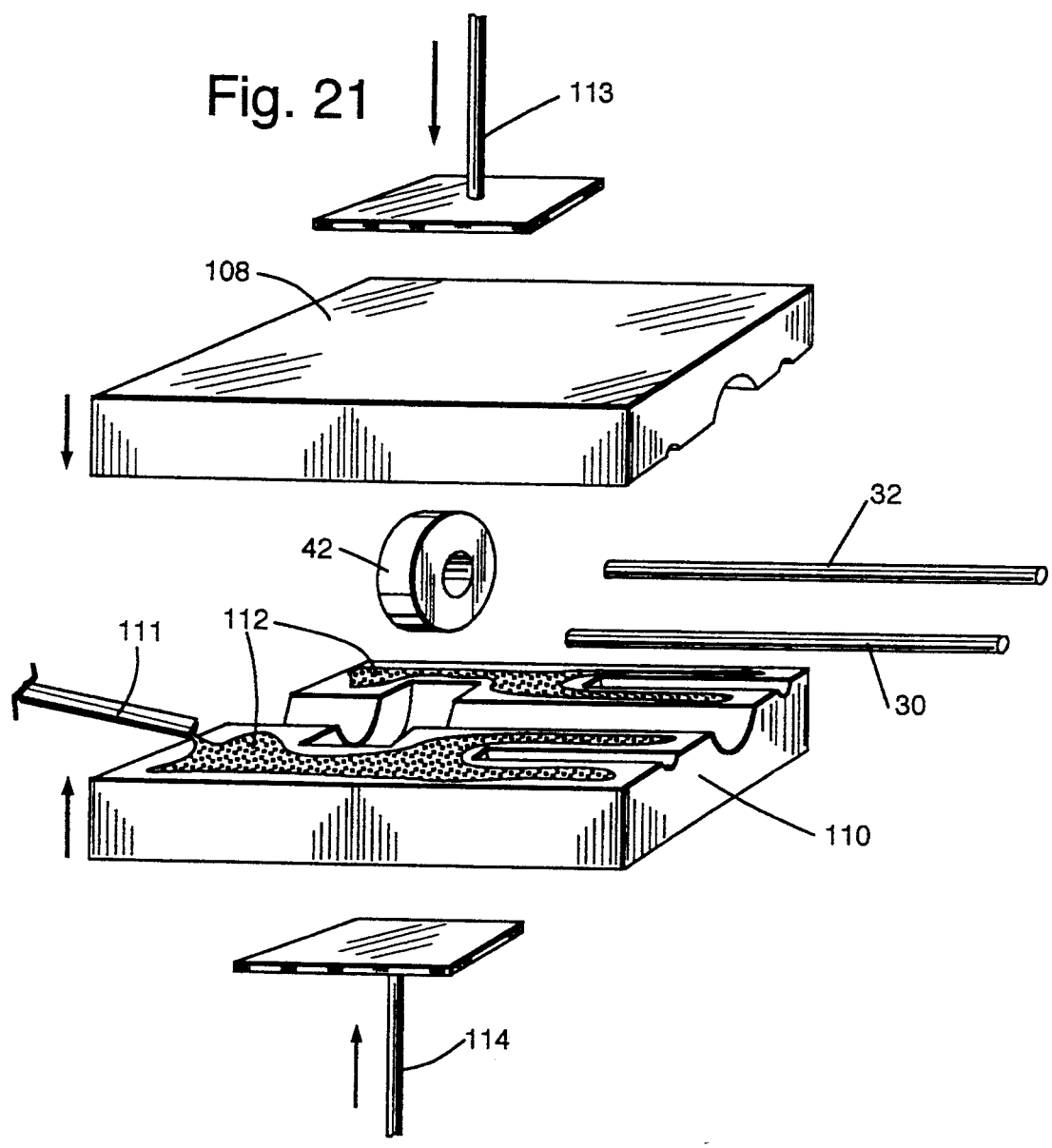
FIG. 21 is a perspective view of two frozen confection pieces made in the mold of FIG. 20 being combined according to the method of the present invention.

Referring to FIG. 21, a first frozen half 108 and a second frozen half 110, both made in the mold of FIG. 20, are shown being joined together to form a frozen confection. A whistle element 42 is placed in the cylindrical space created by the semicylindrical protrusion 96 of the mold in the two halves 108 and 110. Sticks 30 and 32 are placed in the cylindrical spaces created by stick channels 98 and 100 of the mold. A spreader 111 spreads liquid 112 onto half 110. Pressure-applying means in the form of two flat plates 113 and 114 are used to fuse the two frozen halves 108 and 110 into a complete iced confection with an encased whistle therein.

Figure 26:
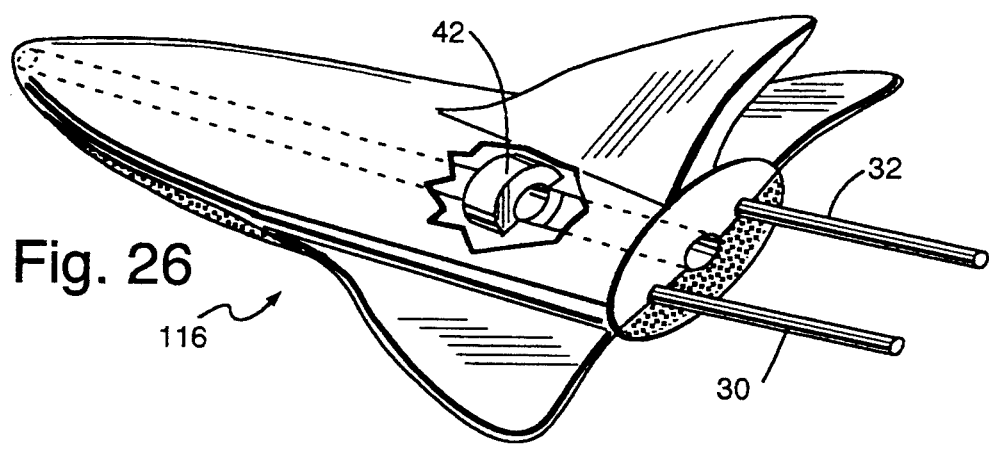
FIG. 26 is a perspective view of a bicolored frozen confection product with encased whistle made using a mold similar to that pictured in FIGS. 14 through 21 but having a more elaborate and decorative shape.

It should be appreciated that the exterior shape of the iced confection need not be limited to a rectangular parallelipiped. So long as the interior spaces for the whistle and the sticks as well as an air channel for producing air flow through the whistle are provided, any sort of decorative and pleasing exterior shape is possible. For example, two different composite molds, each having an identical second part 90 but differing in the shape of their first parts, could be employed to produce an iced confection 116 such as is shown in FIG. 26. In addition to using different molds, different ingredients can be used in the molds to produce different colors and flavors.

Figure 22:
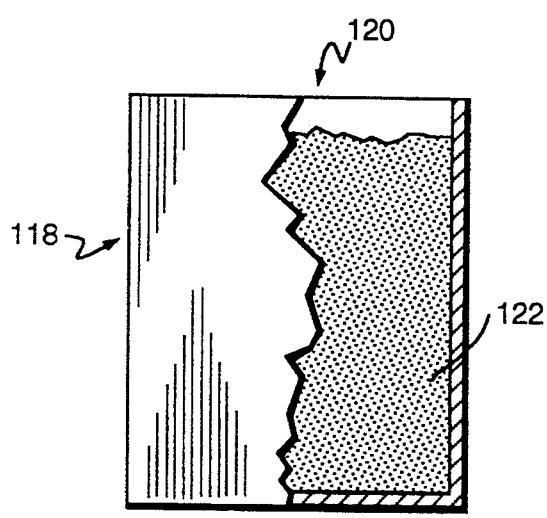
FIG. 22 is a side elevational view, partly broken away and in cross section, of a mold of a third alternative embodiment of the present invention filled with a soft frozen ingredient.
Figure 23:
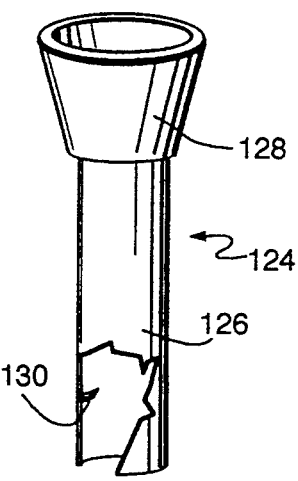
FIG. 23 is a perspective view, partly broken away, of a hollow bore tool.
Figure 24:
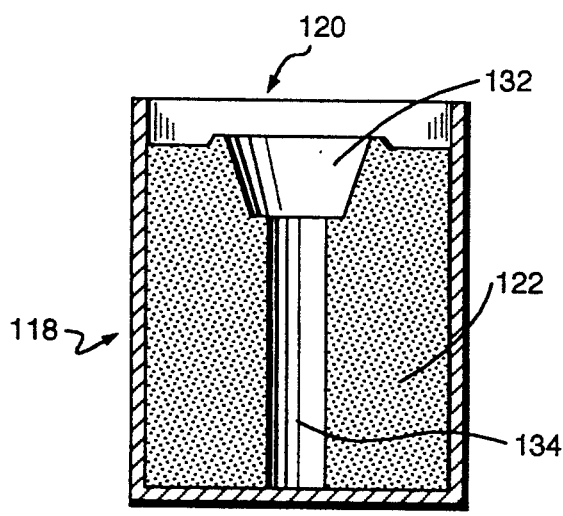
FIG. 24 is a cross-sectional view of the filled mold of FIG. 22 after the tool of FIG. 23 has been used to make a hollow space in the frozen contents of the mold.

Another alternative embodiment of the invention for ice-cream products and the like makes use of a mold 118 as shown in FIG. 22. Mold 118 is simply a container with an open top 120 through which filling of the container can be accomplished. An ingredient 122 is introduced into mold 118 and frozen, after which a central space similar to that in the methods illustrated by FIGS. 8 through 11 by using the tool 124 shown in FIG. 23 to remove a plug of the frozen ingredient having the same shape as the interior of tool 124. Tool 124 comprises a cylindrical tube portion 126 joined to a tubular frustoconical portion 128. As shown in the cut-away part of FIG. 23, there are a plurality of small inwardly projecting hooks 130 on the interior wall of tube portion 126.

Hooks 130 facilitate the removal of the soft frozen ingredient 122 to leave the frustoconical space 132 and the cylindrical space 134.

Figure 25:
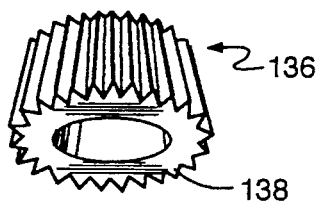
FIG. 25 is a perspective view of another embodiment of an end cap or plug used to fill in the hollow frustoconical portion of the space shown in FIGS. 6, 11, and 24.

One or more sticks are inserted into the soft frozen 122 at this point and a whistle element 42 is dropped into frustoconical space 132. A generally frustoconical plug with a through-hole is then inserted to secure whistle element 42 in place in the confection. The whole product is then further frozen to harden it. FIG. 25 shows one possible type of generally frustoconical plug 136 having a plurality of serrations 138 in the outer surface thereof for increased manageability when plug 136 is inserted into space 132.

Figure 27:
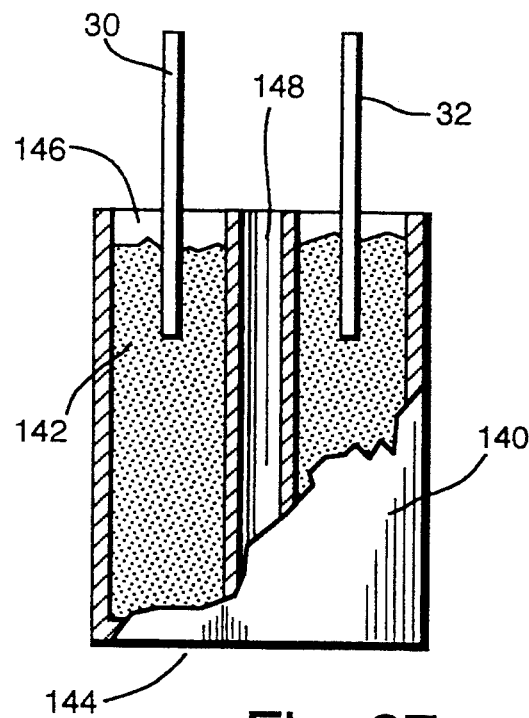
FIG. 27 is a side elevational view, partly broken away and in cross section, of a mold of a fourth alternative embodiment of the present invention filled with a frozen ingredient.
Figure 28:
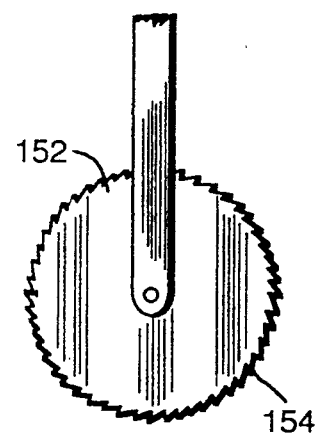
FIG. 28 is a perspective view, partly broken away, of a drilling wheel used to create a whistle recess in the frozen product made in the mold of FIG. 27.
Figure 29:
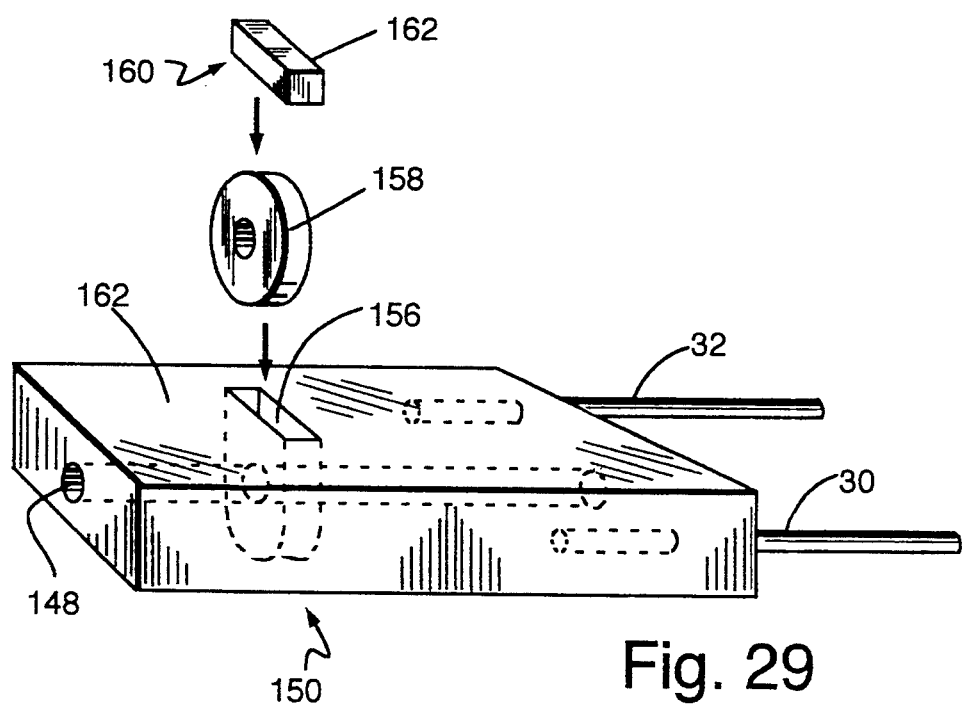
FIG. 29 is a perspective view of the frozen product of the mold of FIG. 27 after the drilling wheel of FIG. 28 has been used to make a hollow space into which a whistle element is shown being inserted with a frozen plug inserted on top of the whistle element to secure it in place.

Still another alternative embodiment of the invention is depicted in FIGS. 27, 28, and 29. Referring to FIG. 27, a unitary mold 140 is filled with a first ingredient 142. Mold 140 has a closed bottom 144 and an open top 146 and a generally central hollow, cylindrical portion 148 extending from open top 146 to closed bottom 144. First and second generally narrow and elongated support members 30 and 32 each have one end immersed in first ingredient 142 in mold 140 and another end outside first ingredient 142.

First ingredient 142 is frozen in mold 140 to produce a first frozen part 150 matching the inside contours of mold 140. Shown in FIG. 28 is a drilling wheel 152 with teeth 154 at the periphery thereof which is used to create a hollow recess 156 in frozen part 150 after part 150 has been removed from mold 140, as shown in FIG. 29.

Hollow recess 156 in first frozen part 150 communicates with cylindrical hollow portion 148. Recess 156 has a shape to accommodate a whistle element 158 and is located with respect to cylindrical hollow portion 148 so as to allow air passage through whistle element 158 when whistle element 156 is inserted into recess 156.

After insertion of whistle element 158 into the recess 156 of first frozen part 150, a plug 160 of a second frozen ingredient is inserted into recess 156 until plug 160 abuts whistle element 158. Plug 160 has a shape which will fit into the recess 156 where recess 156 communicates with an exterior surface 162 of first frozen part 142. Pressure is applied to an outer end 162 of plug 160 and a part of outer surface 162 of first frozen part 150 in contact with and adjoining plug 160 is frozen to plug 160 to bond the part and the plug together.

The first and second ingredients can be different or substantially the same. The generally narrow and elongated support members 30 and 32 can each comprise a wooden stick. Alternatively, the step of creating hollow recess 156 can be accomplished with a heated tool having an appropriate shape.

Figure 30:
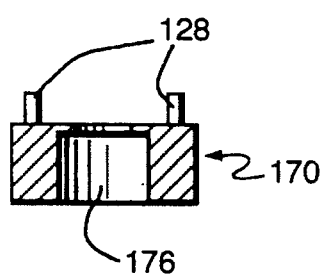
FIG. 30 is a cut-away cross-sectional view of a plug for use in the practice of the invention.
Figure 31:
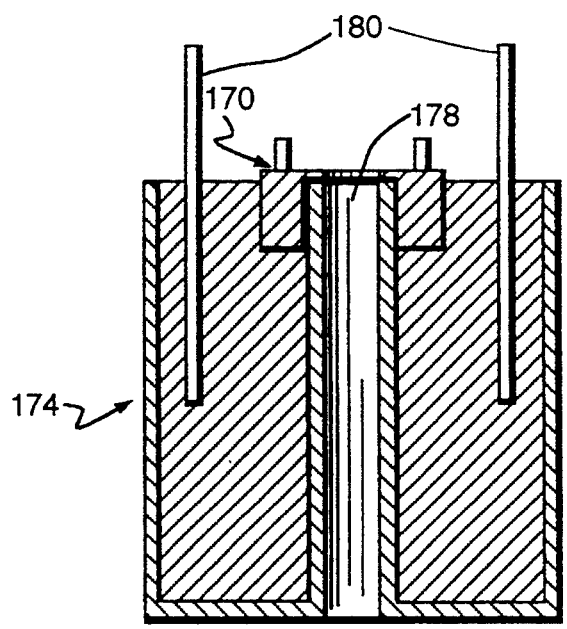
FIG. 31 is a cross-sectional view of a mold similar to FIG. 27.
Figure 32:
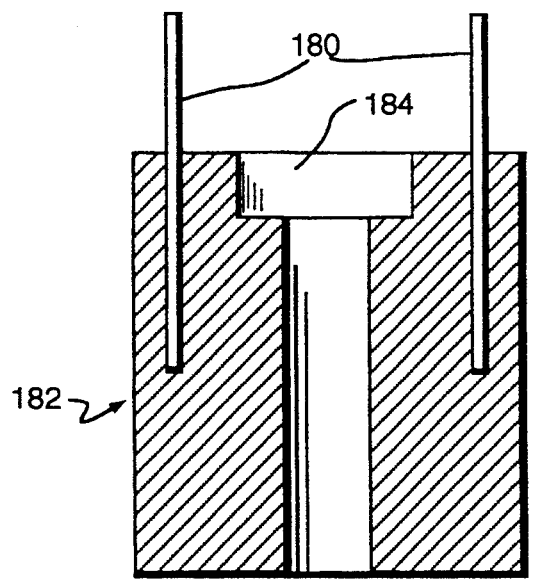
FIG. 32 is a cross-sectional view of a confection made in accordance with the practice of the invention.

Referring to FIGS. 30–32 inclusive, it is seen that plug 170, having tabs 172 for handling and being of metal or plastic is formed to displace the liquid confection when the same is poured into mold 174. It is seen that plug 170 is formed so as to define cavity 176 for association with hollow portion 178 of mold 174. Sticks 180 are frozen in the solid confection 182 having recess 184 for receiving a whistle element, not shown.

The present invention also encompasses the various iced-confection products made by the methods described above using the specialized molds and tools shown in the figures of drawing.

The above-described embodiments are furnished as illustrative of the principles of the invention, and are not intended to define the only possible embodiments in accordance with my teaching. Rather, the invention is to be considered as encompassing not only the specific embodiments shown, but also any others falling within the scope of the following claims. For example, although two sticks in the frozen confection are shown and described, it should be evident that one might suffice or three might be necessary depending on the particular shape of the finished confection. Similarly, although the whistle element and air passageway are shown and described as cylindrical, it will be appreciated that other shapes are possible. The whistle can be made of sugar or any other suitable material. The narrow and elongated support member (e.g., member 32 in FIG. 4) may be inserted into the partially frozen body before it hardens rather than using a holder (see FIG. 4) or a channel (see FIG. 7) to install it. Also, the frustoconical spaces (such as those shown, for example, in FIGS. 1, 3, and 4) could be cylindrical so long as it is easy to insert a whistle element. Finally, various types of whistle elements are well known in the art, and furthermore, the present invention is not intended to be limited to whistles, but is intended to encompass other types of sound-making devices that might produce buzzing sounds such as is made by the well-known and popular kazoo.

I claim:

1. A method of making an iced confection with a whistle inside, comprising:
    filling a first mold with a first ingredient, said first mold having an open top and a generally central hollow portion with a shoulder at an interface between a cylindrical first space and a frustoconical second space:
    holding in place at least one generally narrow and elongated support member having one end immersed in said first ingredient in said first mold and another end outside said first ingredient;
    filling a second mold with a second ingredient, said second mold having an open top, a frustoconical outer wall, and an inner wall defining a cylindrical hollow portion extending through said mold;
    freezing said first and second ingredients in said first and second molds to produce a first frozen part matching the inside contours of said first mold and a second frozen part matching the inside contours of said second mold, respectively;
    removing said first and second frozen parts from said first and second molds;
    inserting a whistle element into a space of said first frozen part corresponding to said second, frustoconical space of said first mold until said whistle element abuts a shoulder of said first frozen part corresponding to said shoulder of said first mold;
    inserting said second frozen part into said space in said first part until it abuts said whistle element;
    applying pressure to an outer end of said second frozen part;
    freezing an outer surface of said first frozen part in contact with an inner surface adjoining said space in said second frozen part to bond said first and second parts together, thereby forming an iced confection having a whistle therein; and
    recovering an iced confection having a whistle therein.

2. The method of claim 1 wherein said first and second ingredients are substantially the same.

3. The method of claim 1 wherein said at least one generally narrow and elongated support member comprises a wooden stick.

4. The method of claim 1 wherein the steps following said inserting of said whistle step comprise:
    filling a space between said whistle element and said first frozen part with a third, liquid ingredient so that an outer periphery of said whistle element is in wetted contact with an inner surface adjoining said frustoconical space in said first frozen part; and
    freezing said third, liquid ingredient to bond said first frozen part and said whistle element together.

5. The method of claim 1 wherein the steps following said removing step comprise:
    dipping a whistle element into a third, liquid ingredient to wet said whistle element with said third, liquid ingredient;
    inserting said whistle element into said first frozen part so that an outer periphery of said whistle element is in wetted contact with an inner surface adjoining said frustoconical space in said first frozen part; and
    freezing said third, liquid ingredient to bond said first frozen part and said whistle element together.

6. A method of making an iced confection with a whistle inside using a first, two-piece mold and a second, unitary mold, comprising:
    filling a first mold with a first ingredient, said first mold comprising a first piece including a container with an open top and a closed bottom with an open cylindrical tube extending outwardly therefrom, and a second, tubular piece including a central cylindrical portion, a first, frustoconical end portion, and a second, cylindrical end portion smaller in diameter than said central portion, said cylindrical end portion of said second piece fitting inside, and sealed by sealing means to, said cylindrical tube extending outwardly from said bottom of said first piece;
    holding in place at least one generally narrow and elongated support member having one end immersed in said first ingredient in said first mold and another end outside said first ingredient;
    filling a second mold with a second ingredient, said second mold having a frustoconical shape matching said frustoconical end portion of said first piece of said first mold, and a cylindrical hollow portion extending through said second mold;
    freezing said first and second ingredients in said first and second molds to produce a first frozen part matching the inside contours of said first mold, said frozen part having a central frustoconical space at one end, and a second frozen part matching the inside contours of said second mold, respectively;
    removing said first and second frozen parts from said first and second molds;
    inserting a whistle element into a space of said first frozen part corresponding to said frustoconical space of said first piece of said first mold until said whistle element abuts a shoulder of said first frozen part corresponding to a place where said first end portion and said central portion of said first piece of said first mold meet;
    inserting said second frozen part into said first frozen part until it abuts said whistle element;
    applying pressure to an outer end of said second frozen part;
    freezing an outer surface of said second frozen part in contact with an inner surface of said space in said first frozen part to bond said first and second parts together, forming an iced confection having a whistle therein; and recovering an iced confection having a whistle therein.

7. The method of claim 6 wherein said at least one generally narrow and elongated support member comprises a wooden stick.

8. The method of claim 6 wherein said sealing means comprises a plurality of O-rings disposed in circular grooves in an outer surface of said open cylindrical tube extending outwardly from said bottom of said second piece of said first mold.

9. The method of claim 6 wherein the steps following said inserting of said whistle step comprise:
    filling a space between said whistle element and said first frozen part with a third, liquid ingredient so that an outer periphery of said whistle element is in wetted contact with an inner surface adjoining said frustoconical space in said first frozen part; and
    freezing said third, liquid ingredient to bond said first frozen part and said whistle element together.

10. The method of claim 9 wherein said first and third ingredients are substantially the same and said second ingredient is substantially different from said first and third ingredients.

11. The method of claim 9 wherein said first, second, and third ingredients are substantially different from each other.

12. The method of claim 9 wherein said first, second, and third ingredients are substantially the same.

13. The method of claim 9 wherein the steps following said removing step comprise:
    dipping a whistle element into a third, liquid ingredient to wet said whistle element with said third, liquid ingredient;
    inserting said whistle element into said first frozen part so that an outer periphery of said whistle element is in wetted contact with an inner surface adjoining said frustoconical space in said first frozen part; and
    freezing said third, liquid ingredient to bond said first frozen part and said whistle element together.

14. A method of making an iced confection with a whistle, comprising:
    filling a mold with a first ingredient, said mold having an open top and a hollow interior portion;
    holding in place at least one generally narrow and elongated support member having one end immersed in a noncentral portion of said first ingredient in said mold and another end outside said first ingredient;
    freezing said first ingredient in said mold to produce a first frozen quantity of said ingredient matching the inside contours of said mold;
    removing a central part of said first frozen quantity of said ingredient using a tubular tool having a frustoconical first end and a narrower cylindrical middle portion and second end, to leave a central hollow space in said first frozen quantity of said ingredient having a frustoconical first end and a narrower cylindrical middle portion and second end;
    inserting a whistle element into said frustoconical first end of said central hollow space of said first frozen quantity of said first ingredient until said whistle element abuts a shoulder of said central hollow space of said first frozen quantity corresponding to where said frustoconical end of said space meets said narrower cylindrical middle portion of said space;
    inserting a second frozen quantity of said ingredient having a shape complementary to said frustoconical end and having a cylindrical through hole therethrough into said space in said first frozen quantity until said second frozen quantity of said ingredient abuts said whistle element;
    applying pressure to an outer end of said frozen quantity;
    freezing an outer surface of said first frozen quantity in contact with an inner surface adjoining said space in said second frozen quantity to bond said first and second quantities together, thereby forming a frozen confection having a whistle therein; and
    removing said frozen confection having a whistle therein from said mold.

15. The method of claim 14 wherein an inside wall of said narrower cylindrical middle portion of said tubular tool has a plurality of inwardly projecting hooks thereon to facilitate said removing of said central part of said first frozen quantity of said ingredient.

16. The method of claim 14 wherein said at least one generally narrow and elongated support member comprises a wooden stick.

17. The method of claim 14 wherein the steps following said inserting of said whistle step comprise:
    filling a space between said whistle element and said first frozen part with a third, liquid ingredient so that an outer periphery of said whistle element is in wetted contact with an inner surface adjoining said frustoconical space in said first frozen part; and
    freezing said third, liquid ingredient to bond said first frozen part and said whistle element together.

18. The method of claim 14 wherein the steps following said removing step comprise:
    dipping a whistle element into a third, liquid ingredient to wet said whistle element with said third, liquid ingredient;
    inserting said whistle element into said first frozen part so that an outer periphery of said whistle element is in wetted contact with an inner surface adjoining said frustoconical space in said first frozen part; and
    freezing said third, liquid ingredient to bond said first frozen part and said whistle element together.

19. A method of making an iced confection with a whistle inside using a two-piece mold comprising:
    filling said mold with a first ingredient, said mold comprising a first piece open at an upper end and first side adjoining said upper end and closed at a lower end, opposed second and third sides connecting said upper and lower ends, and a fourth side opposite said open first side, said mold further including a second piece including a generally flat plate having a shape matching said open side of said first piece and having a first central hollow semicylindrical protuberance running from an upper to a lower end and a second central hollow semicylindrical protuberance of short extend, concentric with said first protuberance, and first and second cylindrical channels on both sides of said first central hollow semicylindrical protuberance, beginning at said lower end and terminating partway up said second piece, said first and second pieces being joined together by joining means to define a container having an open top end and an interior volume into which said first and second protuberances project;

freezing said first ingredient in said mold to produce a first frozen part matching the inside contours of said mold, said first frozen part having a central semicylindrical space at, and first and second cylindrical channels extending partway up said frozen part from said bottom end;

removing said first frozen part from said mold;

filling said mold with a second ingredient;

freezing said second ingredient in said mold to produce a second frozen part matching the inside contours of said mold, said second frozen part having a shape substantially the same as said first frozen part;

removing said second frozen part from said mold;

inserting a whistle element into said larger semicylindrical space of said first frozen part and first and second elongated support members into said first and second cylindrical channels;

spreading a liquid on a surface of said first frozen part intended to contact a matching surface of said second frozen part;

placing said second frozen part in contact with said first frozen part with said whistle element and said support members enclosed between said parts;

applying pressure to opposing outer sides of said first and second frozen parts; and freezing opposed surfaces of sides of said first and second parts having said channels therein to bond said first and second parts together, thereby forming said frozen confection having a whistle therein and recovering same.

20. The method of claim 19 wherein said joining means comprises two substantially C-shaped clip members which are slipped over said second and third sides of said first and second pieces.

21. The method of claim 19 wherein said first and second ingredients are substantially the same.

22. A method of making an iced confection with a whistle inside using a two-piece mold comprising:

filling said mold with a first ingredient, said mold comprising a first piece open at an upper end and a first side adjoining said upper end and closed at a lower end, opposed second and third sides connecting said upper and lower ends, and a fourth side opposite said open first side, said mold further including a second piece including a generally flat plate having a shape matching said open side of said first piece and having a first central hollow semicylindrical protuberance running from an upper to a lower end and a second central hollow semicylindrical protuberance of short extend, concentric with said first protuberance, and first and second cylindrical channels on both sides of said first central hollow semicylindrical protuberance, beginning at said lower end and terminating partway up said second piece, said first and second pieces being joined together by joining means to define a container having an open top end and an interior volume into which said first and second protuberances project;

filling a substantially similar second mold with a second ingredient;

freezing said first and second ingredients in said first and second molds to produce first and second frozen parts each matching the inside contours of said mold, each said frozen part having a central semicylindrical channel running from a top end to a bottom end thereof with a larger semicylindrical space, and first and second cylindrical channels extending partway up said frozen part from said bottom end;

removing said first and second frozen parts from said first and second molds, respectively;

inserting a whistle element into said larger semicylindrical space of said first frozen part and first and second elongated support members into said first and second cylindrical channels;

spreading a liquid on a surface of said first frozen part intended to contact a matching surface of said second frozen part;

placing said second frozen part in contact with said first frozen part with said whistle element and said support members enclosed between said parts;

applying pressure to opposing outer sides of said first and second frozen parts; and freezing opposed surfaces of sides of said first and second parts having said channels therein to bond said first and second parts together, thereby forming said frozen confection having a whistle therein and recovering the same.

23. The method of claim 22 wherein said joining means comprises two substantially C-shaped clip members which are slipped over said second and third sides of said first add second pieces.

24. The method of claim 22 wherein said first and second ingredients are substantially the same.

25. A method of making an iced confection with a whistle inside, comprising:

filling a mold with a first ingredient, said mold having a closed bottom and an open top and a generally central hollow, cylindrical portion extending from said open top to said closed bottom;

holding in place at least one generally narrow and elongated support member having one end immersed in said first ingredient in said first mold and another end outside said first ingredient;

freezing said first ingredient in said mold to produce a first frozen part matching the inside contours of said mold;

removing said first frozen part from said mold;

creating a hollow recess in said first frozen part communicating with said cylindrical hollow portion, said recess having a shape to accommodate a whistle element and located with respect to said cylindrical hollow portion so as to allow air passage through said whistle element when said whistle element is inserted into said recess;

inserting said whistle element into said recess in said first frozen part;

forming a plug of a second frozen ingredient having a shape which will fit into said recess where said recess communicates with an exterior surface of said first frozen part;

inserting said plug into said recess in said first frozen part until said second frozen part abuts said whistle element;

applying pressure to an outer end of said plug; and freezing an outer surface of said first frozen part in contact with and adjoining said plug bond said first frozen part and said plug together to form a frozen confection having a whistle therein and recovering the same.

26. The method of claim 25 wherein said first and second ingredients are substantially the same.

27. The method of claim 25 wherein said at least one generally narrow and elongated support member comprises a wooden stick.

28. The method of claim 25 wherein the step of creating said hollow recess is accomplished with a rotating wheel having teeth on an outer periphery thereof.

29. The method of claim 25 wherein the step of creating said hollow recess is accomplished with a heated tool having an appropriate shape.

* * * * *